US008516728B2

(12) United States Patent
Jung

(10) Patent No.: US 8,516,728 B2

(45) Date of Patent: Aug. 27, 2013

(54) FLEXIBLE DISPLAY APPARATUS

(75) Inventor: Youn Hwan Jung, Hwaseong-si (KR)

(73) Assignee: Samsung Display Co., Ltd., Yongin (KR)

( * ) Notice: Subject to any disclaimer, the term of this patent is extended or adjusted under 35 U.S.C. 154(b) by 46 days.

(21) Appl. No.: 13/284,414

(22) Filed: Oct. 28, 2011

(65) Prior Publication Data

US 2012/0204453 A1 Aug. 16, 2012

(30) Foreign Application Priority Data

Feb. 15, 2011 (KR) ........................ 10-2011-0013362

(51) Int. Cl.

*G09F 15/00* (2006.01)
*G09F 17/00* (2006.01)
*G09F 7/00* (2006.01)
*G02B 23/12* (2006.01)

(52) U.S. Cl.

USPC ................... 40/610; 40/604; 40/603; 40/605; 40/607.01; 40/607.1; 359/453; 359/443; 359/461; 160/135; 160/351; 160/133; 160/329; 160/24; 296/95.1; 345/156; 345/158

(58) Field of Classification Search

USPC ........... 40/610, 604, 603, 605, 607.01, 607.1; 359/453, 443, 461; 160/135, 351, 133, 329, 160/24; 296/95.1; 345/156, 158

See application file for complete search history.

(56) References Cited

U.S. PATENT DOCUMENTS

| | | | | |
|---|---|---|---|---|
| 6,115,951 | A * | 9/2000 | Jing et al. | 40/610 |
| 6,771,232 | B2 * | 8/2004 | Fujieda et al. | 345/30 |
| 7,706,066 | B2 * | 4/2010 | Adams et al. | 359/443 |
| 7,724,508 | B2 | 5/2010 | Bemelmans et al. | |
| 8,184,369 | B2 * | 5/2012 | Kuroi | 359/461 |
| 2009/0122400 | A1 * | 5/2009 | Adams et al. | 359/461 |

FOREIGN PATENT DOCUMENTS

| | | |
|---|---|---|
| CN | 101238426 | 8/2008 |
| JP | 2008-541186 | 11/2008 |
| KR | 10-2008-0020626 | 3/2008 |
| KR | 10-0818170 | 3/2008 |
| KR | 10-2010-0097515 | 9/2010 |
| WO | 2006/123297 | 11/2006 |

* cited by examiner

*Primary Examiner* — Syed A Islam

(74) *Attorney, Agent, or Firm* — H.C. Park & Associates, PLC

(57) ABSTRACT

Provided is a flexible display apparatus that includes: a flexible display apparatus including: a flexible display panel; a housing including an opening through which the flexible display panel enters and exits the housing; a cylinder disposed within the housing to coil and uncoil the flexible display panel; and a stretcher that selectively extends from the opening to support the flexible display panel, such that the flexible display panel is substantially planar when the flexible display panel is extended outside of the housing.

14 Claims, 6 Drawing Sheets

FLEXIBLE DISPLAY APPARATUS

CROSS-REFERENCE TO RELATED APPLICATION

This application claims priority from and the benefit of Korean Patent Application No. 10-2011-0013362, filed on Feb. 15, 2011, which is hereby incorporated by reference for all purposes as if fully set forth herein.

BACKGROUND

1. Field

The present disclosure relates to a flexible display apparatus.

2. Discussion of the Background

Displays constitute an important part of various electronic devices and have been miniaturized for used in portable electronic devices. However, even the miniaturization of electronic devices has failed to satisfy a variety of demands. Thus, the research and development is of flexible displays that can be rolled or folded is currently being conducted.

SUMMARY

The present disclosure provides a flexible display apparatus that includes a flexible display panel that may be easily rolled and unrolled.

Additional features of the invention will be set forth in the description which follows, and in part will be apparent from the description, or may be learned by practice of the invention.

Embodiments of the inventive concept provide a flexible display apparatus including: a flexible display panel; a housing including an opening through which the flexible display panel enters and exits the housing; a cylinder disposed within the housing to coil and uncoil the flexible display panel; and a stretcher that selectively extends from the opening to support the flexible display panel, such that the flexible display panel is substantially planar when the flexible display panel is extended outside of the housing.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept.

DETAILED DESCRIPTION OF THE EMBODIMENTS

Figure 1:
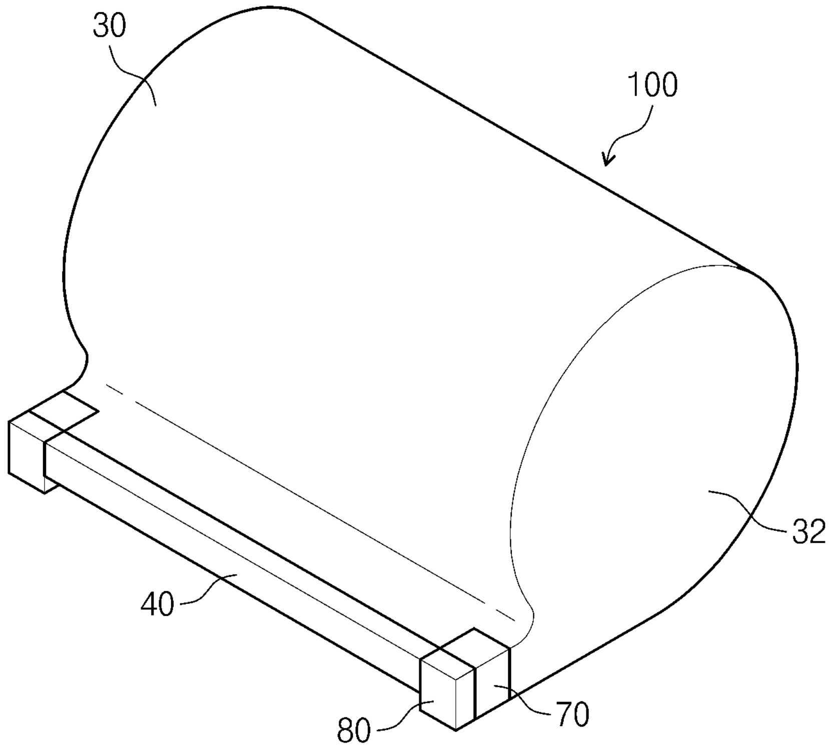
FIGS. 1 and 2 are perspective views illustrating a flexible display apparatus, according to an exemplary embodiment of the present invention.

Exemplary embodiments of the inventive concept will be described below in more detail with reference to the accompanying drawings. Advantages and features of the present invention, and implementation methods thereof will be clarified through following embodiments described with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

In the following description, the technical terms are used only for explaining specific embodiments while not limiting the present invention. The terms of a singular form may include plural forms unless referred to the contrary. The meaning of "comprise" or "comprising" specifies a property, a region, a fixed number, a step, a process, an element and/or a component but does not exclude other properties, regions, fixed numbers, steps, processes, elements and/or components.

Figure 2:
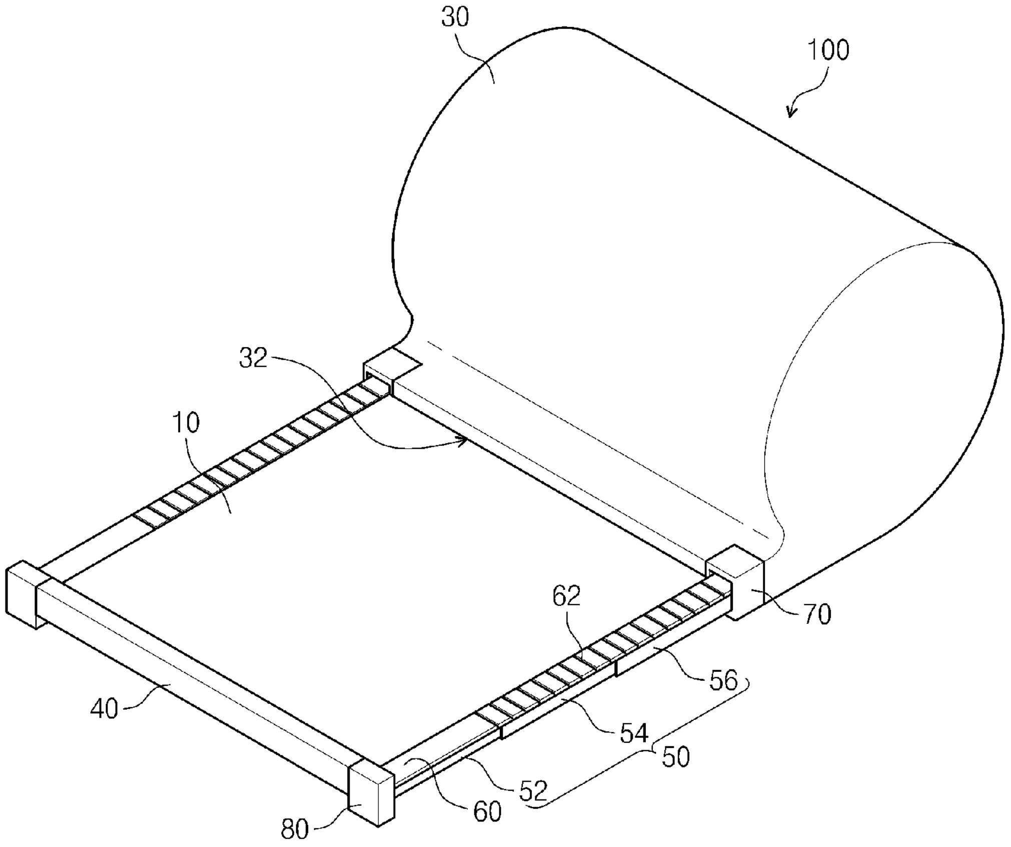
Figure 3:
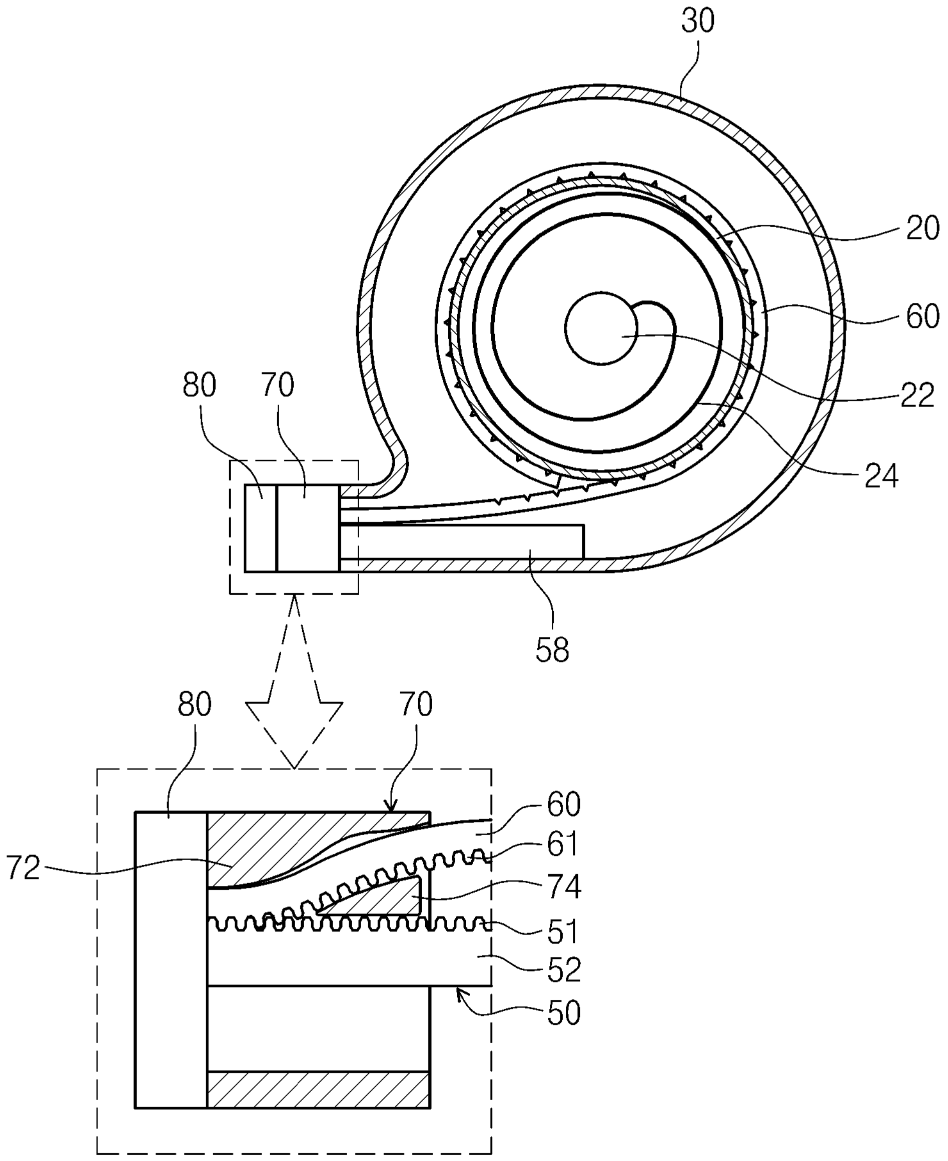
FIGS. 3 and 4 are side views illustrating the flexible display apparatus of FIGS. 1 and 2.
Figure 4:
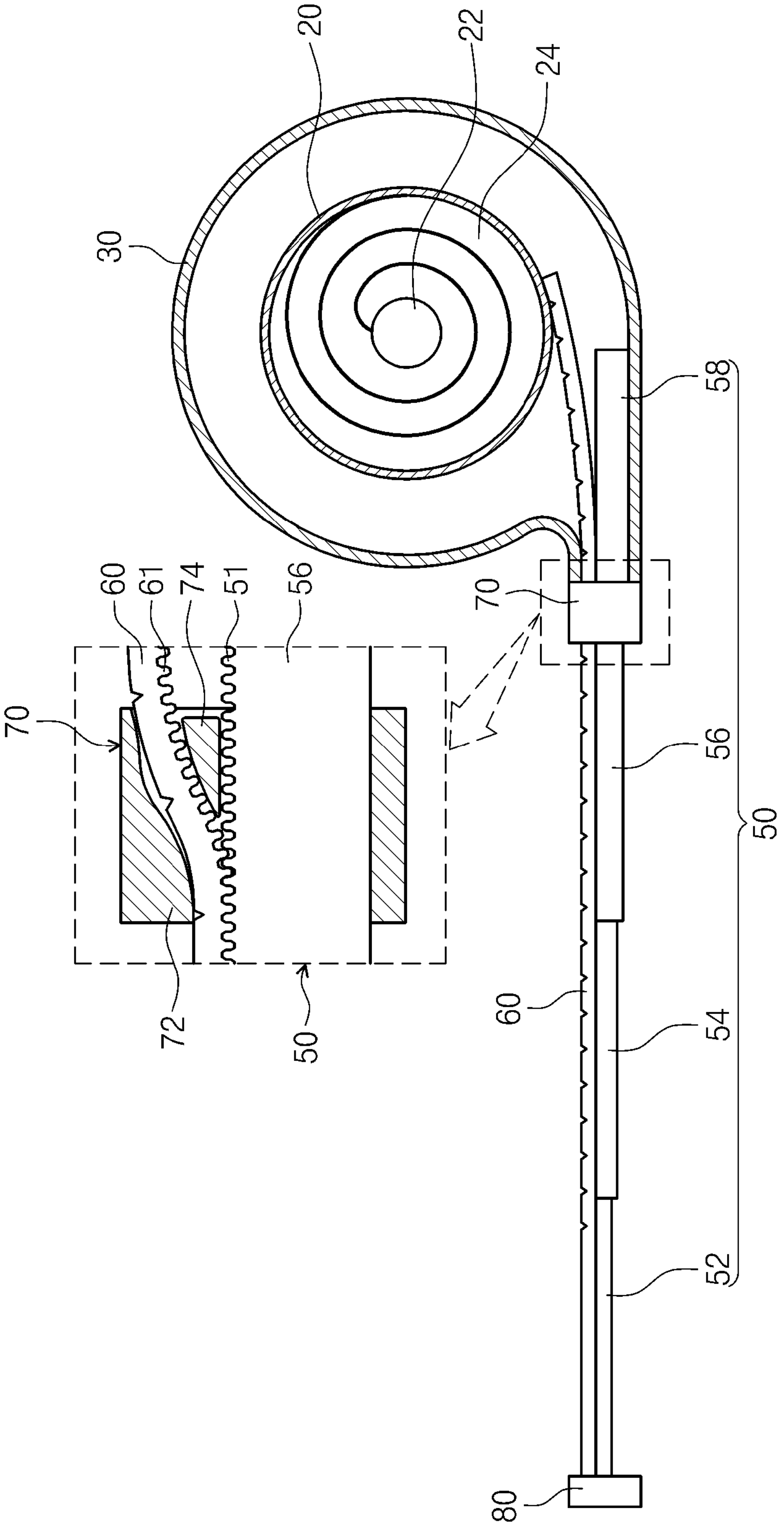
Figure 5:
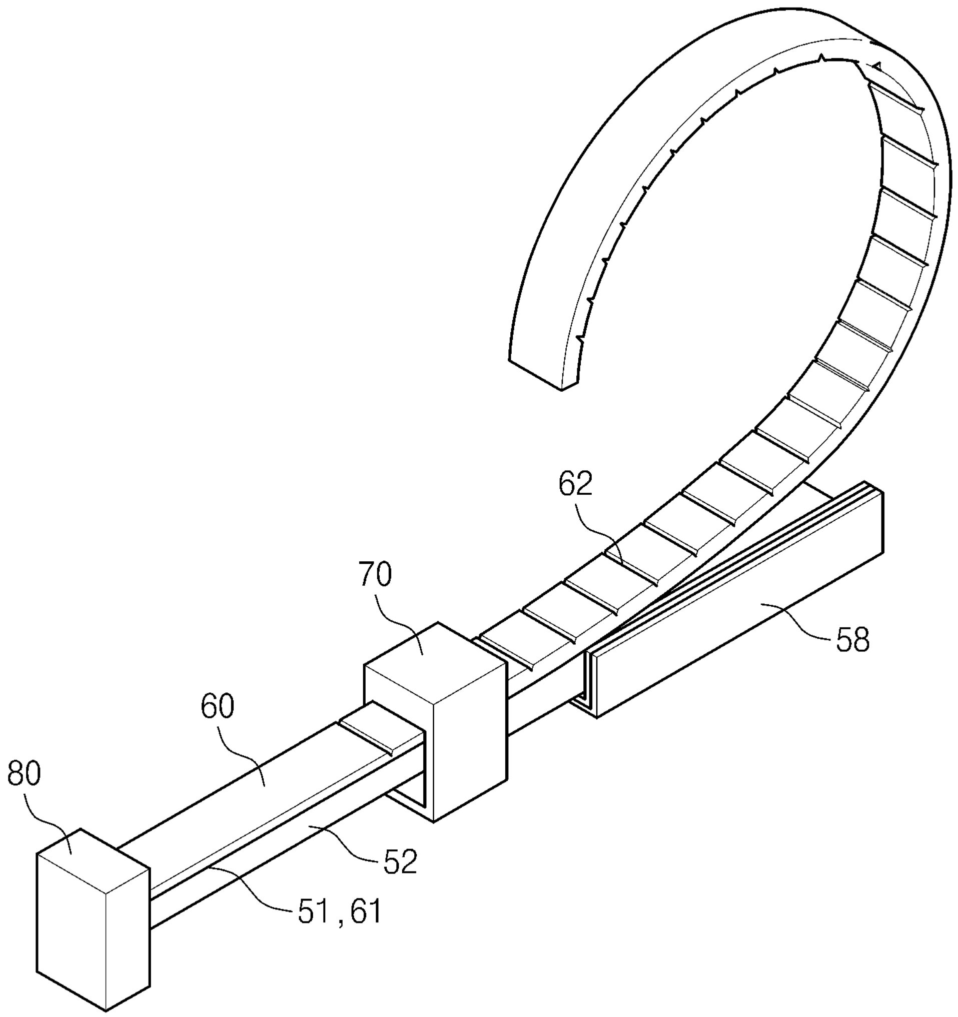
FIGS. 5 and 6 are detailed perspective views illustrating a stretcher, a bender, and a slider of the flexible display apparatus of FIG. 1.
Figure 6:
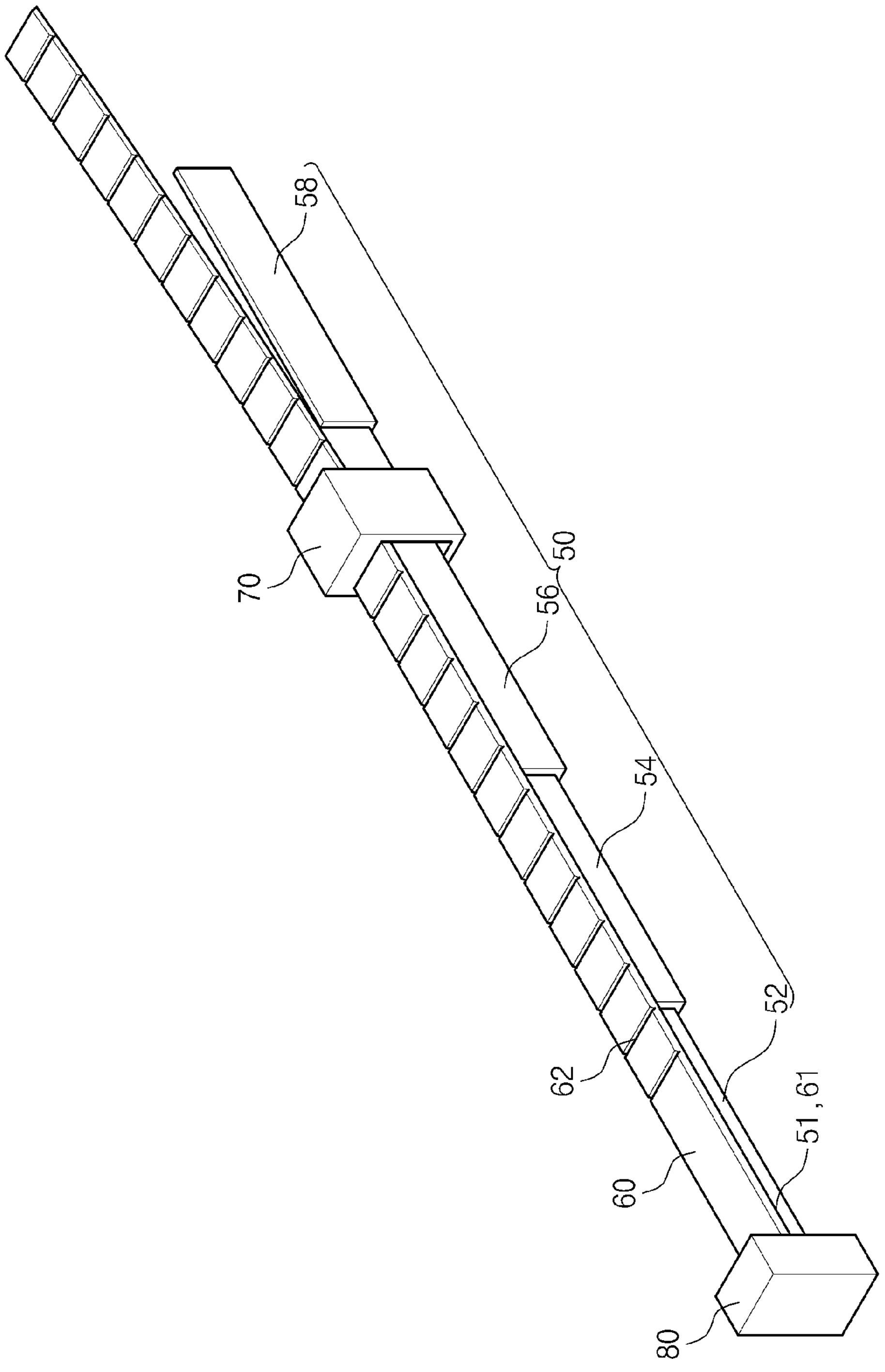

FIGS. 1 and 2 are perspective views illustrating a flexible display apparatus 100, according to an exemplary embodiment of the present invention. FIGS. 3 and 4 are side views illustrating the flexible display apparatus 100 of FIGS. 1 and 2. FIGS. 5 and 6 are detailed perspective views illustrating a stretcher, a bender, and a slider of the flexible display apparatus 100 of FIG. 1.

Referring to FIGS. 1 through 6, the flexible display apparatus 100 includes a stretcher 50 to stretch a flexible display panel 10 in a straight line, at an entrance 32 of a protective cover 30. The stretcher 50 may be extended at the entrance 32 when the flexible display panel 10 is unrolled from a cylinder 20. When the stretcher 50 is retracted, the flexible display panel 10 may be rolled around the cylinder 20 and disposed within the protective cover 30. The flexible display panel 10 may be unrolled out of the protective cover 30. Therefore, the flexible display apparatus 100 improves the portability and convenience of the flexible display panel 10.

The flexible display panel 10 may be rolled around an outer surface of the cylinder 20. The flexible display panel 10 may include a plastic liquid crystal display panel or an organic electroluminescence display panel. Although not illustrated herein, the flexible display panel 10 may include a matrix of pixels that include thin film transistors, and a driving circuit to drive the pixels. The flexible display panel 10 may display a static or dynamic image.

The flexible display panel 10 may be rolled around the cylinder 20, so as to be stored in the protective cover 30. According to some embodiments, the cylinder 20 may be a substantially cylindrical roller. The cylinder 20 may receive a turning force from a spiral spring 24 fixed to a shaft 22 inside the cylinder 20. The spiral spring 24 may be rolled around or unrolled from the shaft 22, when the cylinder 20 rotates. The shaft 22 may be fixed to a sidewall 32 of the protective cover 30. The spiral spring 24 and the flexible display panel 10 may be coiled in the same direction around the shaft 22 and the cylinder 20, respectively. The spiral spring 24 and the flexible display panel 10 may be coiled around the shaft 22 in opposite directions. When the flexible display panel 10 is coiled around the cylinder 20, the spiral spring 24 may be partially uncoiled from the shaft 22. When the flexible display panel 10 is uncoiled from the cylinder 20 and extended out of the protective cover 30, the spiral spring 24 may be coiled around the shaft 22. Therefore, the spiral spring 24 may provide a restoring force, by which the flexible display panel 10 is coiled around the cylinder 20 and pulled into the protective cover 30.

The protective cover 30 may cover the flexible display panel 10 when the flexible display panel 10 is coiled around the cylinder 20. The protective cover 30 may protect the flexible display panel 10 and may be referred to as a housing. The protective cover 30 may be generally tubular and includes an entrance (opening) 32. The protective cover 30 may be included in the housing of a personal digital assistant. The flexible display panel 10 may be inserted into the protective cover 30 through the entrance 32. In addition, the flexible display panel 10 may be pulled out of the protective cover 30 through the entrance 32, when a user pulls a handle 40 away from the protective cover 30. The handle 40 may be fixed to an edge of the display panel 10. The sidewall 32 of the protective cover 30 may secure the shaft 22 and separate the cylinder 20 from the shaft 22. The cylinder 20 may be concentric with the shaft 22. In addition, the sidewall 32 may prevent the spiral spring 24 and the flexible display panel 10 from deviating laterally with respect to the rotational direction of the cylinder 20.

The stretcher 50 may support the flexible display panel 10 in a planar fashion, when the flexible display panel 10 is disposed outside of the protective cover 30. The stretcher 50 may include first, second, third, and fourth sliding brackets 52, 54, 56, and 58 that extend and retract with respect to the protective cover 30. The first to fourth sliding brackets 52, 54, 56, and 58 may have U-shaped frames that have partially opened upper surfaces and may have gradually increasing diameters. The first to fourth sliding brackets 52, 54, 56, and 58 may extend or retract sequentially (telescopically).

The first to fourth sliding brackets 52, 54, 56, and 58 may have first teeth 51 on the upper surfaces thereof. The first teeth 51 may engage with second teeth 61 of the bender 60. The first teeth 51 and the second teeth 61 may be coupled with each other outside the protective cover 30. The first teeth 51 and the second teeth 61 may flatly fix the flexible display panel 10 in a direction horizontal to the stretcher 50. In addition, the first teeth 51, the second teeth 61, and a slider 70 may form a zipper or a slide fastener.

The bender 60 may be fixed to at least one edge of the flexible display panel 10. The bender 60 may cover the edge of the flexible display panel 10. The flexibility of the bender 60 may be similar to the flexibility of the flexible display panel 10. The bender 60 may include a plastic bending bar. The bender 60 may have V-shaped grooves 62 disposed along a first surface thereof that faces the cylinder 20. The second teeth 61 may be disposed on an opposing second surface of the bender 60.

The slider 70 facilitates the coupling of the bender 60 and the stretcher 50, when the flexible display panel 10 is extended out of the protective cover 30. The slider 70 may separate the bender 60 from the stretcher 50 when the flexible display panel 10 is inserted into the protective cover 30. Upper and lower bodies of the slider 70 may engage the first and second teeth 51 and 61 with each other, by positioning the stretcher 50 and the bender 60 firmly together. The slider 70 may include a wedge 74 disposed between upper and lower portions of is the slider body 72, to separate the first teeth 51 from the second teeth 61. The upper and lower surfaces of the wedge 74 may converge where the stretcher 50 and the bender 60 are coupled with each other. The lower surface of the wedge 74 may be parallel to the stretcher 50, and the upper surface of the wedge 74 may be inclined.

End caps 80 may be disposed on opposing sides of the handle 40, covering ends of the stretcher 50 and the bender 60. The end caps 80 may prevent the ends of the stretcher 50 and the bender 60 from separating from each other outside the protective cover 30. When the flexible display panel 10 is rolled around the cylinder 20, the end cap 80 may stop the ends of the stretcher 50 and the bender 60 at the slider 70. Therefore, the end cap 80 may prevent the flexible display panel 10 from separating from the handle 40.

The stretcher 50 may support the flexible display panel 10, such that the flexible display panel 10 is flat when extended out of the protective cover 30. The stretcher 50 and the bender 60 may be coupled with each other outside the protective cover 30, and separated from each other inside the protective cover 30. The slider 70 may couple the stretcher 50 with the bender 60 and separate the stretcher 50 from the bender 60. In the protective cover 30, the flexible display panel 10 and the bender 60 may be rolled around the cylinder 20. Therefore, the stretcher 50 and the bender 60 may facilitate the rolling and unrolling of the flexible display panel 10.

According to various embodiments, the stretcher may support the flexible display panel outside the protective cover, when the flexible display panel is unrolled from the cylinder in the protective cover. Therefore, the flexible display apparatus may facilitate the rolling and unrolling of the flexible display panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A flexible display apparatus comprising:
a flexible display panel;
a housing comprising an opening through which the flexible display panel enters and exits the housing;
a cylinder disposed within the housing to coil and uncoil the flexible display panel;
a stretcher that selectively extends from the opening to support the flexible display panel, such that the flexible display panel is substantially planar when the flexible display panel is extended outside of the housing; and
a bender attached to an edge of the flexible display panel, to couple with the stretcher when the flexible display panel is disposed outside of the housing.

2. The flexible display apparatus of claim 1, wherein the stretcher comprises slide brackets that extend and retract with respect to the opening.

3. The flexible display apparatus of claim 2, wherein the slide brackets and the bender comprise teeth to reversibly couple the slide brackets and the bender.

4. The flexible display apparatus of claim 3, further comprising a slider disposed within the opening, to reversibly couple the bender with the slide brackets.

5. The flexible display apparatus of claim 4, wherein the slider comprises:
a body to guide the bender toward the slide brackets; and
a wedge disposed inside of the body to separate the slide brackets from the bender.

6. The flexible display apparatus of claim 5, wherein the wedge comprises:
a lower surface disposed parallel to the slide brackets; and
an upper surface that is inclined with respect to the lower surface.

7. The flexible display apparatus of claim 2, wherein the bender comprises V-shaped grooves disposed on a first surface thereof that faces the cylinder.

8. The flexible display apparatus of claim 2, further comprising an end cap disposed on ends of the bender and the stretcher and to seal the opening when the bender and stretcher are retracted into the housing.

9. The flexible display apparatus of claim 2, wherein the slide brackets comprise U-shaped frames disposed on one another, so as to telescopically extend from the housing.

10. The flexible display apparatus of claim 1, further comprising a handle disposed along an edge of the flexible display, the edge being disposed opposite to the cylinder.

11. The flexible display apparatus of claim 1, wherein the flexible display panel comprises a liquid crystal display panel or an organic electroluminescence display panel.

12. The flexible display apparatus of claim 1, further comprising a spring to rotate the cylinder, such that the flexible display panel is pulled into the housing.

13. The flexible display apparatus of claim 1, wherein the bender covers an outward facing surface of the flexible display panel, when the flexible display panel is coiled around the cylinder.

14. A flexible display apparatus comprising:

a flexible display panel;

a housing comprising an opening through which the flexible display panel enters and exits the housing;

a cylinder disposed within the housing to coil and uncoil the flexible display panel;

a bender to bend the flexible display panel around the cylinder and to support the flexible display panel when the flexible display panel is disposed outside of the housing; and brackets that selectively extend from the opening to planarize the bender, such that the flexible display panel is substantially planar when the flexible display panel is supported by the bender outside of the housing, and wherein the brackets and the bender are configured to couple when extended from the housing, so as to be disposed on opposing surfaces of at least one edge of the flexible display panel.

* * * * *